United States Patent Office 3,131,575
Patented May 5, 1964

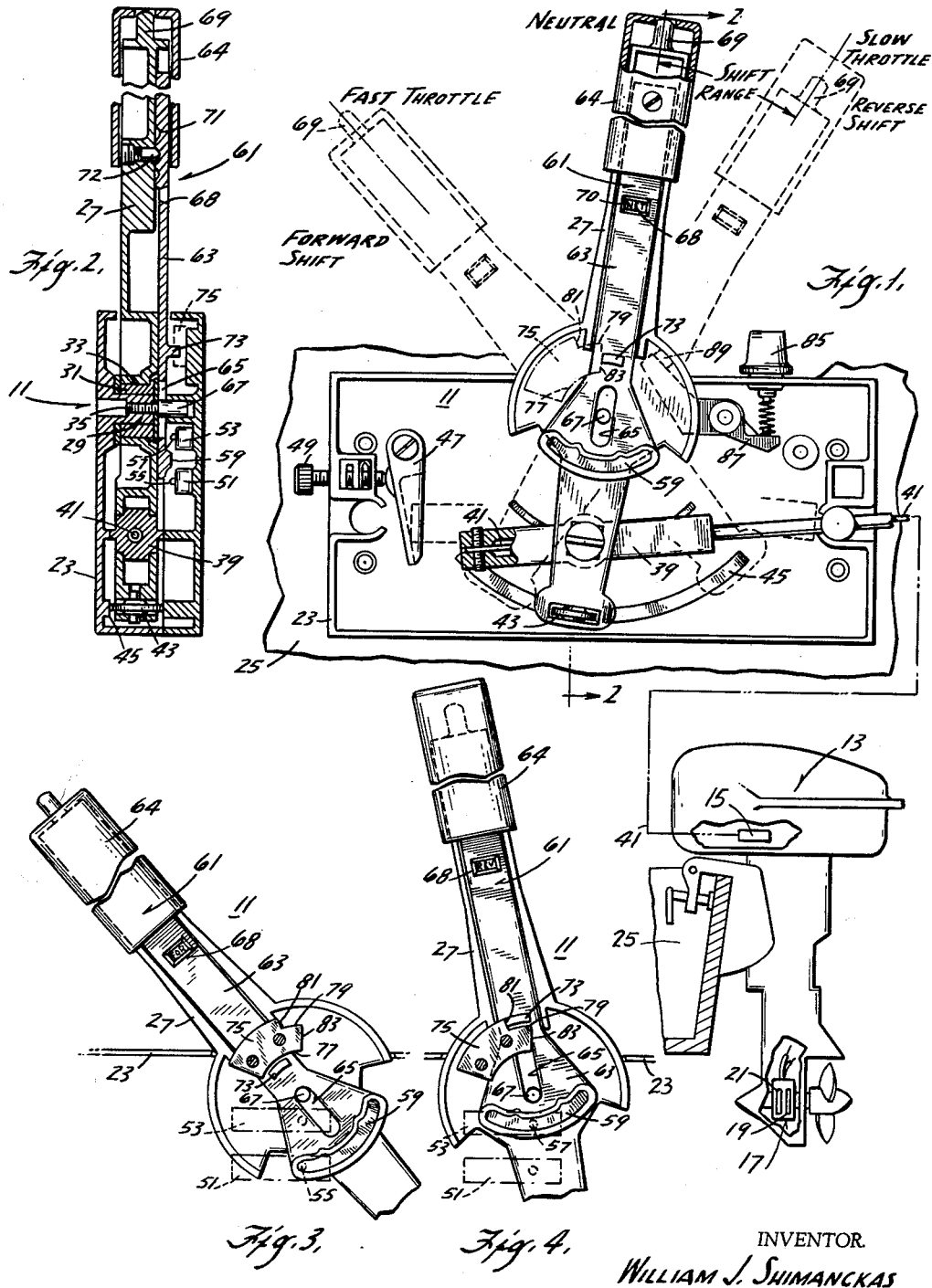

3,131,575
RADIALLY SHIFTABLE SINGLE LEVER SPEED AND CLUTCH CONTROL DEVICE
William J. Shimanckas, Waukegan, Ill., assignor to Outboard Marine Corporation, Waukegan, Ill., a corporation of Delaware
Filed Mar. 22, 1962, Ser. No. 181,719
11 Claims. (Cl. 74—472)

The invention relates generally to speed and shift controls for engines such as internal combustion and turbine engines. More particularly, the invention relates to a single lever throttle and shift control device for an engine incorporating an electrically operated shift or clutch means.

The invention contemplates a single lever shift and speed control device in which the throttle setting of the engine is advanced by movement of the control lever in one direction and is retarded by movement of the lever in the opposite direction. Shifting of the engine is provided by means including a member or slide carried by the control lever for movement relative thereto and by electrical switch means actuated by shifting of said slide or member relative to the control lever. The device also preferably incorporates means in the form of a lug and a stop carried for selective interfering engagement with each other so that, in the preferred embodiment which contemplates forward drive, rearward drive, and neutral clutch engagements, a full range of adjustment from low to high speed is provided when the control device is set for forward drive, so that a limited range of engine throttle advancement from low speed is provided when the control device is set for rearward drive, and so that a still further limited range of engine throttle advancement from low speed is provided when the control device is set for neutral. Moreover, the lug and stop means are arranged to prevent shifting of the slide or member, and as a consequence, shifting of the engine, whenever the lever is advanced beyond a predetermined position, i.e., the position of highest possible throttle setting when the slide or member is positioned for neutral engagement of the clutch.

Thus, the single lever control provides for limited advancement of the throttle setting when the engine is in neutral, thereby facilitating warming up of the engine, while preventing operation at excessive speeds when the engine is not under load, prevents shifting of the engine at throttle settings above said limited advancement, limits advance of the throttle setting when the engine is in reverse, and permits full speed or throttle control when the engine is in forward.

The principal object of the invention is the provision of an improved single lever device for controlling an engine having an adjustable throttle and electrically operated clutch means. A further object of the invention is the provision of such a control device in association with a boat and an engine mounted thereon for propulsion thereof. Other objects and advantages of the invention will become known by reference to the following description and the accompanying drawings of one embodiment of the invention in which:

FIGURE 1 is a fragmentary, elevational view, partially in section with certain parts omitted, and partially diagrammatic on a reduced scale, of a boat incorporating a control device in accordance with the invention. In FIGURE 1, the control is set in neutral with the highest possible speed setting.

FIGURE 2 is a sectional view taken generally along line 2—2 of FIGURE 1;

FIGURE 3 is a partial view, similar to a portion of FIGURE 1, showing the control in its full speed forward position; and FIGURE 4 is a view similar to FIGURE 3, showing the control in its full speed reverse position.

The speed and clutch control device 11, illustrated in FIGURE 1, is intended for control of an engine 13 (shown schematically) having an adjustable throttle 15 and an electrically actuated clutch 17, including a pair of energizable coils 19 and 21, enabling operation of the engine in neutral, in forward drive, and in rearward drive. Forward drive of the engine 13 is provided incident to energizing of the coil 19 and rearward drive is provided incident to energizing of the coil 21. When neither of the coils 19 and 21 is energized, the engine 13 is in neutral. One example of an engine incorporating an electrically operated reversing clutch is fully disclosed in my copending application entitled "Marine Propulsion Device With Electromagnetic Reversing Clutch," Serial No. 143,773, filed on October 9, 1961, and assigned to the assignee of this application.

Considering now the speed and clutch control device 11, said device includes a frame 23 which can be suitably mounted on the hull of a boat 25, shown fragmentarily in FIGURE 1. Mounted on the frame 23 is a speed control member in the form of a lever 27. The particularly disclosed construction, as shown best in FIGURE 2, includes suitable means for pivotally mounting the lever including a stud 29 extending from the frame 23, a bushing 31, an aperture 33 in the lever 27, and a retaining screw 35 threadedly engaged in the stud 29.

Below its pivotal mounting, the lever 27 pivotally supports an anchor block 39 to which there is secured one end of a push-pull cable 41 which, in turn, is secured at its other end to the throttle 15 of the engine 13. At its lower extremity, the lever 27 includes a roller 43 which is engageable on a track 45 on the frame 23 to generally prevent pivoting of the lever 27 about an axis extending lengthwise of the frame. From the foregoing, it is apparent that shifting of the lever counterclockwise from its slow throttle position, shown in dotted outline in FIGURE 1, advances the throttle until the lever 27 reaches its full or fast throttle position, also shown in dotted outline in FIGURE 1. Movement of the lever 27 beyond its illustrated full throttle position is limited by engagement of the lever 27 with the frame 23, while the slow throttle setting of the lever can be adjustably determined by means including a pivotally mounted stop 47 adapted for engagement with the left end of the anchor block 39, as seen in FIGURE 1, and an adjusting screw 49 threaded in the frame 23 in adjustable engagement with the stop 47.

Actuation of the electromagnetic clutch is afforded by switch means including a pair of normally open switches 51 and 53 (see FIGURE 2) which, in the disclosed construction, are mounted on the frame 23 and are respectively electrically connected to the coils 19 and 21. The switches 51 and 53 each include respective actuators or buttons 55 and 57 which are located in radial alignment with the pivotal mounting of the lever and in radially spaced relation to each other. The buttons 55 and 57 are selectively actuated to close the electrical circuits to the coils by means in the form of a lug or projection 59 on control means in the form of a member or assembly 61 which is carried by and is movable relative to the lever 27.

More particularly, the movable member 61 constitutes a slide assembly which is movable radially of the pivotal mounting of the lever 27. Still more particularly, the slide assembly 61 includes a slide 63 which is guided for radial movement at its upper end by connection with a sleeve 64 arranged in generally telescopically enclosing relation to the upper end of the lever 27. At its lower end, the slide 63 is guided by means including a radially elongated slot 65 in which there is engaged a post 67 extending from the retaining screw 35.

As shown in FIGURES 1 and 2, the lever 27 includes a button or extension 69 which projects, incident to radial shifting of the slide assembly 61, through an opening in the top of the sleeve 64. The relation of the button 69 to the top of the sleeve 64 permits the operator to determine, without looking, the setting of the slide assembly 61 relative to the lever 27. If desired, the lever 27 can also incorporate suitable markings, as indicated at 70, which markings are selectively viewable through an opening 68 in the slide 63 and indicate the condition of the clutch means corresponding to the applicable position of the slide assembly 61.

Preferably, detent means are provided between the lever 27 and the slide assembly 61 to locate the several shift positions of the slide assembly and to prevent unwanted displacement from a particular position. Such means comprises, in the disclosed construction, a series of concavities 71 (see FIGURE 2) on the inner face of the slide 63 and a spring loaded button or detent 72 which is carried by the lever 27 and is releasably engageable in the concavities 71.

The projection 59 which is selectively engageable with the switch actuators 55 and 57 to cause closure of the switches 51 and 53 incident to radial shifting of the slide assembly 61, extends arcuately along the lower margin of the slide 63, for a sufficient distance to maintain the engaged one of the switch actuators in closed condition throughout the applicable range of throttle-controlling lever movement.

Throttle-advancing-movement of the lever 27 is controlled when the slide 63 is in its various clutch controlling positions, and radial shifting of the slide assembly 61 is prevented to thereby preclude shifting of the clutch means when the engine throttle is above a predetermined setting, by co-operating interfering stop and lug means on the slide assembly and on the frame. More particularly, the slide 63 includes a lug 73, while there is mounted on the frame 23 a stop 75 which is proportioned and located relative to the lug 73 to effect the desired control.

Specifically, the stop 75 constitutes a block having an arcuate lower edge 77 which is disposed, as shown in FIGURE 3, above the lug 73 when the slide assembly 61 is in its forward drive position, thereby permitting a full range of throttle-adjusting-movement by the lever 27. The upper edge of the block includes a segment 79 which is disposed below the lug 73 when the slide assembly is in its reverse drive position, as shown in FIGURE 4, and which permits throttle-advancing-movement of the lever 27 until engagement of the lug 73 with a shoulder 81 at the end of the segment, thereby limiting throttle advancement by the lever 27. When the slide assembly 61 is in its neutral position, the lug 73 is positioned for interference with the end edge 83 of the stop 75 incident to attempted throttle-advancing-movement of the lever 27 beyond a predetermined engine throttle setting.

As can also be seen from FIGURES 3 and 4, the lower edge 77 and upper edge segment 79 of the stop 75 prevent radial movement of the slide assembly 61 when the lever 27 is advanced beyond the predetermined engine throttle setting defined by engagement of the lug 73 with the end edge 83 of the stop 75.

The disclosed speed and shift control 11 also includes means for adjustably frictionally restraining pivotal movement of the lever 27. This means comprises a button 85 which is threadedly engaged in the frame 23 and is operable through a resilient connection with a pivotally mounted arm 87, which arm includes a shoe 89 in resilient engagement with the under surface of a downwardly concave, arcuate surface on the lever 27.

Various of the features of the invention are set forth in the following claims.

What is claimed is:

1. In a control device for an engine having a throttle and electrically actuated clutch means, said device including a frame, a control member movably mounted on said frame and adapted for connection to the engine throttle for adjustment thereof between high and low engine speed settings incident to movement of said control member, and means for actuating the engine clutch means including switch means adapted to be connected to the engine clutch means, the improvement wherein
said actuating means includes control means carried by said control member and movable relative thereto for effecting operation of said switch means.

2. An improvement in accordance with claim 1 including
means on said control means and on said frame for interfering engagement to selectively limit engine throttle adjusting movement of said control member in accordance with the position of said control means relative to said control member and for permitting movement of said control means relative to said control member only when said control member is in a preselected position of engine throttle adjustment.

3. An improvement in accordance with claim 2 wherein
said control member is a lever mounted pivotally on said frame,
said switch means is mounted on said frame, and
said control means is a slide shiftable along said lever in radial directions with respect to the pivotal mounting of said lever, said slide including means for operatively engaging said switch means incident to radial movement of said slide.

4. An improvement in accordance with claim 3 wherein
said switch means comprises a pair of normally open switches each having an actuator in radial alignment with the pivotal mounting of said lever and in spaced relation to each other, and
said switch engaging means is selectively engageable with said switches incident to its radial movement, and extends arcuately to retain said switches in closed condition when engaged with their respective actuators, throughout the permissible range of engine-throttle-adjusting lever movement.

5. An improvement in accordance with claim 3 wherein
said lever and said slide include detent means affording retention of said slide in a plurality of positions relative to said lever.

6. An improvement in accordance with claim 3 wherein
said electrically actuated clutch means is selectively operable to effect operation of said engine in forward drive and in neutral, and
said interfering engagement means comprises
a lug on one of said frame and said control means, and
a stop on the other of said frame and said control means, said stop and said lug being located relative to each other and being proportioned relative to each other so that, when said control means is positioned to effect forward drive operation of said engine, said stop permits a full range of movement of said lever, thereby to effect adjustment of the engine throttle throughout the range between said high and low speed settings, and so that, when said control means is positioned to effect neutral operation of said engine, said stop engages said lug to limit movement of said lever, thereby to prevent advancement of the engine throttle beyond a predetermined engine throttle setting above low speed setting.

7. An improvement in accordance with claim 3 wherein said electrically actuated clutch means is selectively operable to effect operation of said engine in neutral, forward drive, and rearward drive, and said interfering engaging means comprises
- a lug on one of said frame and said control means, and
- a stop on the other of said frame and said control means, said stop and said lug being located relative to each other and being proportioned relative to each other so that, when said control means is positioned to effect forward drive operation of said engine, said stop permits a full range of movement of said lever, thereby to effect adjustment of the engine throttle throughout the range between high and low speed settings, and so that when said control means is positioned to effect either of neutral and rearward drive operation of said engine, said stop engages said lug to limit movement of said lever, thereby to prevent advancement of the engine throttle beyond predetermined engine throttle settings above low speed setting.

8. In a control device for an engine having a throttle and electrically operated clutch means, the combination of
- a frame,
- a lever adapted for connection to the engine throttle for adjustment between high and low engine speed settings incident to pivotal movement of said lever,
- means for pivotally mounting said lever on said frame,
- means for electrically controlling operation of the engine clutch means including
   - means carried by said lever and shiftable radially of said lever mounting means, and
   - switch means adapted to be connected to the engine clutch means and operated incident to radial shifting of said radially shiftable means, and
- means on said radially shiftable means and on said frame for interfering engagement to selectively limit throttle adjusting movement of said lever in accordance with the radial position of said radially shiftable means and for preventing radial shifting of said radially shiftable means when said lever is positioned above a preselected engine speed setting.

9. An improvement in accordance with claim 8 wherein said electrically actuated clutch means is selectively operable to effect operation of said engine in neutral, forward drive, and rearward drive, and said interfering engaging means comprises
- a lug on said radially shiftable means, and
- a stop on said frame, said stop and said lug being located relative to each other and being proportioned relative to each other so that, when said radially shiftable means is positioned to effect forward drive operation of the engine, said stop permits a full range of movement of said lever, thereby to effect adjustment of the engine throttle throughout the range between high and low speed settings, and so that, when said radially shiftable means is positioned to effect either of neutral and rearward drive operations of said engine, said stop engages said lug to limit movement of said lever, thereby to prevent advancement of the engine throttle beyond predetermined engine throttle settings above low speed setting.

10. An improvement in accordance with claim 9 wherein
- said switch means comprises a pair of normally open switches each having an actuator in radial alignment with said lever mounting means and in spaced relation to each other, and
- said radially shiftable means includes means selectively engageable with said switches for closure thereof incident to radial movement of said radially shiftable means and extending arcuately of said radially shiftable means for retaining said switches in closed condition, when engaged with their respective actuators, throughout the permissible range of engine throttle adjusting lever movement.

11. The combination of
- a boat,
- an engine on said boat, said engine including electrically operated clutch means for shifting said engine and a throttle for controlling the speed of said engine,
- a control device located on said boat remotely from said engine, said device including
   - a lever connected to said engine throttle for adjustment between high and low engine speed settings incident to movement of said lever,
   - means for pivotally mounting said lever on said device, and
   - means on said device connected to said engine clutch means for electrically controlling operation thereof and including
      - means carried by said lever for shifting radially of said lever mounting means, and
      - switch means connected to said engine clutch means and operated incident to radial shifting of said radially shiftable means, and
   - means on said radially shiftable means and on said frame for interfering engagement to selectively limit throttle adjusting movement of said lever in accordance with the radial position of said radially shiftable means and for preventing radial shifting of said radially shiftable means when said lever is positioned above a preselected engine speed setting.

No references cited.